(12) United States Patent
Nishizawa et al.

(10) Patent No.: US 9,636,857 B2
(45) Date of Patent: May 2, 2017

(54) LABEL FOR IN-MOLD FORMING

(75) Inventors: Takatoshi Nishizawa, Kamisu (JP); Yasuo Iwasa, Kamisu (JP)

(73) Assignee: Yupo Corporation, Tokyo (JP)

( * ) Notice: Subject to any disclaimer, the term of this patent is extended or adjusted under 35 U.S.C. 154(b) by 1362 days.

(21) Appl. No.: 11/630,616

(22) PCT Filed: Jun. 29, 2005

(86) PCT No.: PCT/JP2005/011981
§ 371 (c)(1),
(2), (4) Date: Dec. 22, 2006

(87) PCT Pub. No.: WO2006/003949
PCT Pub. Date: Jan. 12, 2006

(65) Prior Publication Data
US 2007/0218227 A1 Sep. 20, 2007

(30) Foreign Application Priority Data
Jun. 30, 2004 (JP) ................. 2004-192600

(51) Int. Cl.
| | | |
|---|---|---|
| G09F 3/04 | (2006.01) | |
| B32B 7/02 | (2006.01) | |
| B32B 7/12 | (2006.01) | |
| B32B 27/06 | (2006.01) | |
| B32B 27/08 | (2006.01) | |
| B32B 27/16 | (2006.01) | |
| B32B 27/32 | (2006.01) | |
| B29C 45/14 | (2006.01) | |
| B29L 31/34 | (2006.01) | |

(52) U.S. Cl.
CPC .. *B29C 45/14836* (2013.01); *B29C 45/14811* (2013.01); *B32B 7/02* (2013.01); *B32B 7/12* (2013.01); *B32B 27/06* (2013.01); *B32B 27/08* (2013.01); *B32B 27/16* (2013.01); *B32B 27/32* (2013.01); *G09F 3/04* (2013.01); *B29C 45/14647* (2013.01); *B29L 2031/3456* (2013.01); *B32B 2307/31* (2013.01); *B32B 2307/402* (2013.01); *B32B 2307/41* (2013.01); *B32B 2307/704* (2013.01); *B32B 2307/75* (2013.01); *B32B 2519/00* (2013.01); *Y10T 428/1352* (2015.01)

(58) Field of Classification Search
None
See application file for complete search history.

(56) References Cited

U.S. PATENT DOCUMENTS

| | | | | |
|---|---|---|---|---|
| 4,069,123 | A * | 1/1978 | Skoultchi et al. | 524/523 |
| 5,760,135 | A * | 6/1998 | Korpman et al. | 525/95 |
| 6,562,454 | B2 * | 5/2003 | Takahashi et al. | 428/354 |
| 2002/0100547 | A1 | 8/2002 | Takahashi et al. | |
| 2003/0157313 | A1 * | 8/2003 | Shibuya et al. | 428/314.4 |
| 2004/0094949 | A1 * | 5/2004 | Savagian et al. | 283/81 |
| 2004/0161565 | A1 * | 8/2004 | Dronzek, Jr. | 428/40.1 |
| 2005/0191449 | A1 * | 9/2005 | Funato et al. | 428/34.1 |

FOREIGN PATENT DOCUMENTS

| | | |
|---|---|---|
| CN | 1357861 | 7/2002 |
| JP | 2-84319 | 3/1990 |
| JP | 5-249895 | 9/1993 |
| JP | 8-56799 | 3/1996 |
| JP | 9-207166 | 8/1997 |
| JP | 11-134460 | 5/1999 |
| JP | 11-231782 | 8/1999 |
| JP | 2002-49905 | 2/2002 |
| JP | 2002-74303 | 3/2002 |
| JP | 2002-123810 | 4/2002 |
| JP | 2002-236896 | 8/2002 |
| JP | 2002-269526 | 9/2002 |
| JP | 2003-6598 | 1/2003 |
| JP | 2003-76963 | 3/2003 |
| JP | 2003-295767 | 10/2003 |

OTHER PUBLICATIONS

CRC Handbook of Chemistry and Physics, 89th ed, 2008-2009.*
Handbook of Adhesives and Sealants, Petrie, E. M., McGraw-Hill, 2000, pp. 296-298.*
$2^{nd}$ Notification of Office Action issued in corresponding Chinese Application No. 200580022131.9, The State Intellectual Property Office of China, Jan. 8, 2010 with an English translation—6 pages.

* cited by examiner

*Primary Examiner* — Frank D Ducheneaux
(74) *Attorney, Agent, or Firm* — Hamre, Schumann, Mueller & Larson, P.C.

(57) ABSTRACT

A label for in-mold forming comprising a thermoplastic resin film with a heat-sealable layer, a printable thermoplastic resin film, and an antenna and an IC chip. The antenna and the IC chip are interposed between the thermoplastic resin films. The label is strong and water resistant with a high adhesive strength. The label has the function of an IC label and has a printable surface. Also provided is a thermoplastic resin container bearing the label. Bonding the label to a thermoplastic resin container does not damage the IC chip and antenna.

26 Claims, No Drawings

LABEL FOR IN-MOLD FORMING

TECHNICAL FIELD

The present invention relates to a label for in-mold forming that has a multilayer constitution having in an inner part thereof an antenna and an IC chip both for non-contact data sending/receiving and which is capable of data reading/writing. The label for in-mold forming obtained according to the invention has a surface that is suitable for printing. It is free from the fear about security that the IC chip and antenna (hereinafter referred to as IC module) disposed therein may be seen through. Furthermore, when the label is bonded to a thermoplastic resin container, the IC module disposed therein is not damaged by the heat or pressure of the molten thermoplastic resin. In addition, since the label for in-mold forming has excellent strength, water resistance, and adhesion strength, it is usable in both indoor and outdoor applications and even in water and can be used for containers for frozen foods, industrial products, various containers for chemicals, manufacturing process control applications, physical distribution management applications, tote boxes, etc.

BACKGROUND ART

Cards that have an IC module therein and are capable of non-contact data sending/receiving through an external reader or writer are spreading in recent years. IC labels for use in the same application have been proposed that have a pressure-sensitive adhesive layer and are used after having been bonded to an adherend (see, for example, patent documents 1, 2, and 3).

A label for in-mold forming is known as one mode of label. This label can be used to produce a labeled resin molding in the following manner. The label is set beforehand in a mold so as to be in contact with the mold wall. A molten thermoplastic resin is injection-molded with the mold, or a parison of a molten thermoplastic resin is introduced into the mold and blow-molded. Alternatively, a sheet of a molten thermoplastic resin is molded with the mold by vacuum forming or pressure forming. (See, for example, patent documents 4 and 5).

Compared to pressure-sensitive adhesive labels employing a pressure-sensitive adhesive, such labels for in-mold forming are advantageous because they attain high adhesion strength, have excellent water resistance and durability, and can retain stable adhesion strength even in a low-temperature environment having a temperature lower than the glass transition point of the pressure-sensitive adhesive. In addition, since labels for in-mold forming that have been bonded cannot be stripped off and applied again, the labels have an advantage that frauds such as disguise and alteration can be prevented.

An IC label can be used as a label for in-mold forming that comprises a thermoplastic resin film and is bonded to a resin molding by in-mold forming, so as to take advantage of that property of an IC module by which it is capable of repeated data sending/receiving. A resin molding obtained as a molded article including the label united therewith is usable in both indoor and outdoor applications and even in water, and can be used advantageously even in severe environments as containers for frozen foods, industrial products, and various containers for chemicals, in manufacturing process control applications and physical distribution management applications, and as tote boxes, etc. This labeled resin molding is effective in preventing frauds, such as disguise and alteration, from being committed through label replacement.

Patent document 6 proposes an extrusion-molded resin article obtained by setting an IC module as it is in a predetermined position in a mold and extruding a thermally molten resin into the mold to embed the IC module therein. When an IC module is used in such product production processes in which it is embedded in a resin molding, the IC module undergoes a heating step. It has been said that IC modules have heat resistance sufficient to enable the modules to withstand temperatures necessary for molding in producing thermoplastic resin moldings. These IC modules are highly bulky so as to protect the circuit and are expensive.

However, small IC modulus developed recently need not employ a highly heat-resistant polyimide film as the constituent base film because there is no need of heating to a high temperature in IC chip/antenna bonding. Partly for the purpose of reducing the cost of IC modules themselves, inexpensive polyester films and polyethylene films have come to be used. Furthermore, there is a fear that the trend toward size reduction in IC chips themselves may lead to a decrease in resistance to thermal stress due to the decrease in heat capacity. It is presumed that even a process for producing the same extrusion-molded resin article will pose problems such as a deteriorated product yield in the future if the heat history for the IC modules is not sufficiently taken into account.

Patent document 7 includes a statement concerning a non-contact data carrier label usable in in-mold forming. However, in patent document 7 also, the label is used in a manner in which the IC module comes into direct contact with a thermally molten resin during in-mold forming. This technique hence causes troubles, for example, that the IC module breaks due to an abrupt temperature change as in the case of the IC modules described above and that the antenna part deforms due to the pressure applied for extruding the molten resin. This prior-art label is insufficient from the standpoint of IC module protection in the technique of in-mold forming.

IC chips have extremely low resistance to electrostatic charge, and there may be a possibility that the IC chips might break due to static buildup in the label material during label formation, printing, or in-mold forming. Because of this, to take a measure against static buildup is important.

Patent Document 1: JP-A-11-134460
Patent Document 2: JP-A-11-231782
Patent Document 3: JP-A-2002-074303
Patent Document 4: JP-A-02-084319
Patent Document 5: JP-A-09-207166
Patent Document 6: JP-A-08-056799
Patent Document 7: JP-A-2002-049905

DISCLOSURE OF THE INVENTION

Problems that the Invention is to Solve

Namely, a subject for the invention is to protect an IC module from heat, pressure, and static buildup during label formation, printing, and in-mold forming. An object of the invention is to provide a label for in-mold forming that has an IC module disposed therein and is capable for eliminating troubles in production. Another object of the invention is to provide a thermoplastic resin container bearing the label.

Means for Solving the Problems

The present inventors made intensive investigations on labels for in-mold forming that have an IC module disposed therein and are suitable for in-mold forming. As a result, they have found that those problems can be eliminated by fixing an IC module by embedding it in at least two thermoplastic resin films.

Namely, the invention provides a label for in-mold forming that has the following constructions and a thermoplastic resin container bearing the label.

<<1>> A label for in-mold forming, which comprises: a thermoplastic resin film (1) having a heat-sealable layer (1a); a thermoplastic resin film (2) that is printable; and an antenna and an IC chip for data sending/receiving, the antenna and the IC chip being interposed between the thermoplastic resin film (1) and the thermoplastic resin film (2).

<<2>> The label for in-mold forming as described under <<1>> above, wherein the thermoplastic resin film (1) has a film layer (1b) having voids therein, the porosity of the thermoplastic resin film (1) as determined using the following equation is 1-60%, and the thermal conductivity of the thermoplastic resin film (1) is 0.01-0.5 W/m·K:

Porosity (%)=[($\rho_0$−$\rho$)/$\rho_0$]×100

(wherein $\rho_0$ is the true density of the film and $\rho$ is the density of the film).

<<3>> The label for in-mold forming as described under <<2>> above, wherein the film layer (1b) has been stretched at least uniaxially.

<<4>> The label for in-mold forming as described under any one of <<1>> to <<3>> above, wherein the thermoplastic resin film (1) and the thermoplastic resin film (2) have a degree of heat shrinkage of 0-5%.

<<5>> The label for in-mold forming as described under any one of <<1>> to <<4>> above, wherein at least one of the thermoplastic resin film (1), the thermoplastic resin film (2), and the label for in-mold forming has an opacity of 70-100%.

<<6>> The label for in-mold forming as described under any one of <<1>> to <<5>> above, which comprises an adhesive layer (3) between the thermoplastic resin film (1) and the thermoplastic resin film (2), the adhesive layer (3) comprising at least one member selected from a pressure-sensitive adhesive, a curing type resin adhesive, an ultraviolet-curing type adhesive, and an electron-beam-curing type adhesive.

<<7>> The label for in-mold forming as described under any one of <<1>> to <<6>> above, wherein the adhesion strength between the thermoplastic resin film (1) and the thermoplastic resin film (2) is 300 gf/25 mm or higher.

<<8>> The label for in-mold forming as described under <<6>> or <<7>> above, wherein at least one of the thermoplastic resin film (1) and the thermoplastic resin film (2) has a light transmittance as measured at a wavelength of 380 nm of 60% or higher and the adhesive layer (3) comprises an ultraviolet-curing type adhesive.

<<9>> The label for in-mold forming as described under any one of <<1>> to <<8>> above, wherein the thermoplastic resin film (2) has a printable layer (2a) on at least one side thereof.

<<10>> The label for in-mold forming as described under <<9>> above, wherein information comprising either a bar code or a two-dimensional bar code has been printed on the printable layer (2a).

<<11>> The label for in-mold forming as described under any one of <<1>> to <<10>> above, wherein the thermoplastic resin film (2) has a hiding layer (2b) on at least one side thereof.

<<12>> The label for in-mold forming as described under <<11>> above, wherein the hiding layer (2b) comprises at least one of a thin metal film, a white pigment coat, a white solid printing, and a black solid printing.

<<13>> The label for in-mold forming as described under any one of <<1>> to <<12>> above, wherein at least one of the thermoplastic resin film (1) and the thermoplastic resin film (2) comprises a crystalline polyolefin resin.

<<14>> The label for in-mold forming as described under <<13>> above, wherein the crystalline polyolefin resin is a propylene resin.

<<15>> The label for in-mold forming as described under any one of <<1>> to <<14>> above, wherein at least one of the thermoplastic resin film (1) and the thermoplastic resin film (2) contains at least one of inorganic fine powders and organic fillers.

<<16>> The label for in-mold forming as described under any one of <<1>> to <<15>> above, wherein the heat-sealable layer (1a) comprises a heat-sealable resin comprising an ethylene resin having a melting point of 50-130° C.

<<17>> The label for in-mold forming as described under any one of <<1>> to <<15>> above, wherein the heat-sealable layer (1a) is one formed by applying a water-based coating fluid comprising a heat-sealable resin dispersion having a phase transition temperature of 50-140° C. to the thermoplastic resin film (1) and drying the coating fluid applied.

<<18>> The label for in-mold forming as described under any one of <<1>> to <<17>> above, wherein the antenna and IC chip for data sending/receiving have the function of any of an RFID, a smart tag, and an active tag.

<<19>> The label for in-mold forming as described under any one of <<1>> to <<18>> above, wherein at least one side of the label has antistatic performance.

<<20>> A thermoplastic resin container bearing the label for in-mold forming as described under any one of <<1>> to <<19>> above integrally bonded thereto by in-mold forming.

<<21>> The thermoplastic resin container as described under <<20>> above, wherein the adhesion strength between the thermoplastic resin container and the label for in-mold forming is 300 gf/25 mm or higher.

<<22>> The thermoplastic resin container as described under <<20>> or <<21>> above, which is molded in a mold by at least one molding technique selected from injection molding, blow molding, pressure-difference forming, and expansion molding.

Advantages of the Invention

The label for in-mold forming of the invention has the function of an IC label, is excellent in strength, water resistance, and adhesion strength, and has a surface which is printable. It is effective in preventing frauds, such as disguise and alteration, from being committed through label replacement. The label is free from the fear about security that the IC chip or antenna disposed therein may be seen through. When the label is bonded to a thermoplastic resin container, the IC chip and antenna disposed therein are not damaged by the processing.

The thermoplastic resin container bearing the label is usable in both indoor and outdoor applications and even in water, and can be used advantageously as containers for frozen foods, industrial products, and various containers for chemicals, in manufacturing process control applications and physical distribution management applications, and as tote boxes, etc.

BEST MODE FOR CARRYING OUT THE INVENTION

The label for in-mold forming of the invention and the thermoplastic resin container bearing the label will be explained below in detail. In this description, each numerical range given with "–" means the range including the numerals before and after the "–" as the lower limit and the upper limit, respectively.

The label for in-mold forming of the invention comprises a thermoplastic resin film (1) having a heat-sealable layer (1a) and a thermoplastic resin film (2) which is printable, and has an antenna and an IC chip for non-contact data sending/receiving, the antenna and the IC chip being interposed between the thermoplastic resin film (1) and the thermoplastic resin film (2).

In the invention, the thermoplastic resin film (1) having a heat-sealable layer (1a), during in-mold forming, comes into direct contact with a molten resin for forming a thermoplastic resin container. As a result, the heat-sealable layer (1a) is activated to thereby tenaciously bond the resin film (1) to the container. In addition, the resin film (1) serves to prevent the antenna and IC chip from coming into direct contact with the molten resin and thereby protect these from damage by heat or stress. The thermoplastic resin film (2) covers the antenna and IC chip so as to prevent these from being exposed and impart water resistance and durability thereto. The resin film (2) further enables the label to be printed at least on one side with information, e.g., a bar code, to thereby enhance convenience and appearance. The thermoplastic resin film (2) usually is opaque and prevents the antenna and IC chip disposed in the label from being seen through.

The thermoplastic resin film (1) preferably has a film layer (1b) having voids therein, and the porosity of the thermoplastic resin film (1) as determined using the following equation is preferably 1-60%, more preferably 10-50%, especially preferably 20-45%.

Porosity (%)=[($\rho_0$–$\rho$)/$\rho_0$]×100

(In the equation, $\rho_0$ is the true density of the film and $\rho$ is the density of the film. The true density is the density of the film excluding the voids).

The thermal conductivity of the thermoplastic resin film (1) is preferably 0.01-0.5 W/m·K, more preferably 0.05-0.15 W/m·K, especially preferably 0.08-0.12 W/m·K.

The presence of the film layer (1b) having voids enhances the cushioning properties and heat-insulating properties of the thermoplastic resin film (1) to protect the antenna and the IC chip with higher certainty. Furthermore, when the label for in-mold forming is bonded, the film layer (1b) enables a temperature necessary for activating the heat-sealable layer (1a) to be maintained effectively.

In case where the porosity is lower than 1%, heat-insulating properties are insufficient. In case where the porosity exceeds 60%, in-mold forming tends to result in an unattractive appearance attributable to the collapse of voids, such as orange peel. Thermoplastic resin films having a thermal conductivity lower than 0.01 W/m·K are generally difficult to obtain, while thermoplastic resin films having a thermal conductivity exceeding 0.5 W/m·K have insufficient heat-insulating properties.

It is preferred that the film layer (1b) have been stretched at least uniaxially. The stretching, which will be explained later in detail, imparts voids to the film layer (1b) and enables the porosity thereof to be regulated easily. Furthermore, the stretching/orientation of the thermoplastic resin contained in the film layer (1b) can impart thickness evenness, rigidity, etc. suitable for post-processing including printing and use as a label.

The thermoplastic resin film (1) and the thermoplastic resin film (2), which constitute the label for in-mold forming of the invention, each have a degree of heat shrinkage of preferably 0-5%, more preferably 0-4%. In case where the degree of heat shrinkage of the label exceeds 5%, this label is apt to be deformed by the heat of a molten resin when bonded to a thermoplastic resin container and this is apt to result in an impaired appearance. Especially in the case of labels for in-mold forming that have a multilayer structure comprising at least two thermoplastic resin films as in the invention, the thermoplastic resin film (2) constituting a label surface is apt to lift off after in-mold forming due to the mold shrinkage of the thermoplastic resin container or a difference in heat history between the film (1) and the film (2). In this case, an unattractive appearance is apt to result due to blistering. There also is a fear that the label shrinkage may deform the antenna part fixed in the label. Consequently, it is desirable that the thermoplastic resin film (1) and the thermoplastic resin film (2), which constitute the label for in-mold forming of the invention, should have a minimal degree of heat shrinkage, have been tenaciously bonded and fixed to each other, and have higher rigidity.

At least one of the thermoplastic resin film (1), thermoplastic resin film (2), and label for in-mold forming has an opacity of preferably 70-100%, more preferably 80-100%, especially preferably 90-100%. In particular, by regulating the opacity of the thermoplastic resin film (2) to 70% or higher, the fear about security that the IC chip and antenna disposed inside the film may be seen through is eliminated and this label can be apparently handled like ordinary labels. In addition, by regulating the opacity of either of the thermoplastic resin film (1) and the label for in-mold forming to 70% or higher, the surface of the thermoplastic resin container can be prevented from being seen through and the attractiveness of a design printed on the label and the accuracy of bar code reading can be improved.

A preferred specific technique for embedding and fixing an antenna and an IC chip between the thermoplastic resin film (1) and the thermoplastic resin film (2) is one in which an adhesive layer (3) is disposed between the thermoplastic resin film (1) and the thermoplastic resin film (2).

The adhesive layer (3) preferably comprises at least one member selected from a pressure-sensitive adhesive, a curing type resin adhesive, an ultraviolet-curing type adhesive, and an electron-beam-curing type adhesive. The higher the adhesion strength between the thermoplastic resin film (1) and the thermoplastic resin film (2), the more the label for in-mold forming is preferred from the standpoint of enhancing the water resistance, durability, and security thereof. Specifically, the adhesion strength is preferably 300 gf/25 mm or higher, more preferably 300-8,000 gf/25 mm, especially preferably 500-7,000 f/25 mm. In case where the adhesion strength between the film (1) and the film (2) is lower than 300 gf/25 mm, separation readily occurs and the thermoplastic resin film (2) constituting a label surface is apt to liftoff. As a result, an unattractive appearance is apt to result due to blistering, etc.

When at least one of the thermoplastic resin film (1) and the thermoplastic resin film (2) is regulated so as to have a light transmittance of 60% or higher as measured with light having a wavelength of 380 nm and an ultraviolet-curing type adhesive is used as the adhesive layer (3) to bond the film (1) to the film (2) while irradiating the adhesive with ultraviolet, then tenacious adhesion can be obtained in a short processing time and positional shifting does not occur between the film (1) and the film (2) after the curing. Consequently, this technique is especially preferred. The thermoplastic resin film (2) preferably has a printable layer (2a) on at least one side thereof. The printable layer (2a) is provided for the purpose of properly conducting various printing operations or printing with a printer when the invention is used as a label. Consequently, not only information such as a bar code or a two-dimensional bar code but also other information can be printed on the printable layer (2a). For example, information about the product related to the thermoplastic resin container bearing the label, such as trade name, manufacturer's name, seller's name, product usage, notes, character, trademark, logo mark, or design, can be printed.

It is also preferred that the thermoplastic resin film (2) should have a hiding layer (2b) on at least one side thereof. The hiding layer (2b) can comprise at least one member selected from a thin metal film, a white pigment coat, a white solid printing, and a black solid printing. The hiding layer (2b) is intended to improve the opacity of the thermoplastic resin film (2). By providing this layer, the fear about security that the IC chip and antenna disposed inside the film may be seen through is eliminated and this label can be handled like ordinary labels.

The thin metal film formed on the thermoplastic resin film (2) in such a degree that it neither inhibits nor interferes with the data sending/receiving by the IC module imparts a metallic appearance and thereby contributes to an improvement in label appearance attractiveness. The white pigment coat and the white solid printing or the like contribute to an improvement in the accuracy of bar code reading.

<Thermoplastic Resin Films (1) and (2)>

Examples of thermoplastic resins usable for forming the thermoplastic resin film (1) and the thermoplastic resin film (2), which constitute the label for in-mold forming of the invention, include polyolefin resins such as ethylene resins, e.g., high-density polyethylene, medium-density polyethylene, and low-density polyethylene, propylene resins, poly(methyl-1-pentene), and ethylene/cycloolefin copolymers, thermoplastic polyester resins such as poly(ethylene terephthalate), copolymers thereof, poly(ethylene naphthalate), and aliphatic polyesters, polyamide resins such as nylon-6, nylon-6,6, nylon-6,10, and nylon-6,12, and thermoplastic resins such as poly(vinyl chloride), polycarbonates, atactic polystyrene, syndiotactic polystyrene, ABS resins, ionomers, and poly(phenylene sulfide). These resins may be used as a mixture of two or more thereof.

From the standpoints of processability, moldability, strength, flexibility, water resistance, chemical resistance, and weatherability, it is preferred that at least one of the films should comprise a polyolefin resin from among those resins. At least one of the films more preferably comprises a crystalline polyolefin resin, and especially preferably comprises a propylene resin having a low thermal conductivity.

Examples of such propylene resin include propylene homopolymers having isotactic or syndiotactic stereoregularity and copolymers of propylene and one or more of α-olefins such as ethylene, 1-butene, 1-hexene, 1-heptene, and 4-methyl-1-pentene. These copolymers may be bipolymers, terpolymers, or quadripolymers, and may be random copolymers or block copolymers.

An inorganic fine powder, an organic filler, or the like can be incorporated suitably into those thermoplastic resins. When at least one of the thermoplastic resin film (1) and the thermoplastic resin film (2) contains at least one of inorganic fine powders and organic fillers and is stretched, then many fine voids can be formed in the film using the inorganic or organic ingredient as nuclei. The incorporation thereof is preferred because it contributes to a reduction in the thermal conductivity of the label, improvement in opacity, etc.

The kinds of the inorganic fine powders and organic fillers are not particularly limited. Examples of the inorganic fine powders include heavy calcium carbonate, lightweight calcium carbonate, calcined clay, talc, barium sulfate, diatomaceous earth, magnesium oxide, zinc oxide, titanium dioxide, and silicon oxide. Of these, heavy calcium carbonate, calcined clay, and talc are preferred because they are inexpensive and bring about satisfactory moldability.

Examples of the organic fillers include poly(ethylene terephthalate), poly(butylene terephthalate), polyamides, polycarbonates, poly(ethylene naphthalate), polystyrene, melamine resins, poly(ethylene sulfide), polyimides, poly(ethyl ether ketone), poly(phenylene sulfide), homopolymers of cycloolefins, and copolymers of a cycloolefin and ethylene or the like. Of these, it is preferred to use an organic filler that has a higher melting point than the thermoplastic resin to be used as the film and is incompatible with the resin.

One of those inorganic fine powders or organic fillers may be used alone, or two or more of these may be selected and used in combination. In the case of using a combination of two or more, this combination may comprise a mixture of an inorganic fine powder and an organic filler.

Furthermore, a dispersant, antioxidant, compatibilizing agent, ultraviolet stabilizer, antiblocking agent, permanent antistatic agent, etc. can be added to the thermoplastic resins as to needed.

The thermoplastic resin film (1) and the thermoplastic resin film (2) in the invention may consist of a single layer or may be composed of two or more layers. In the case where the film (1) or (2) is composed of two or more layers, the film may have a structure comprising a base layer and a surface layer disposed on one or each side of the base layer. In this case, these layers may be constituted of the same thermoplastic resin or of different thermoplastic resins. When an inorganic fine powder or an organic filler is incorporated into those layers, the layers may be equal to or different from each other in the kind and amount of the powder or filler.

It is preferred that the thermoplastic resin film (1) and the thermoplastic resin film (2) should comprise a layer that has been stretched at least uniaxially. In the case where two or more layers are stretched, the individual layers may be stretched separately before laminating. Alternatively, the layers may be laminated and then stretched together. It is also possible to laminate a stretched layer and then further stretch the layer.

Various known techniques can be used for the stretching. With respect to temperatures for the stretching, the stretching can be conducted in a temperature range suitable for each thermoplastic resin. Specifically, in the case where the thermoplastic resin to be used is a noncrystalline resin, it is stretched at a temperature not lower than the glass transition point thereof. In the case where the resin is a crystalline resin, it is stretched at a temperature not lower than the glass transition point of noncrystalline parts of the resin and not higher than the melting point of crystalline parts thereof. Examples of the stretching techniques include longitudinal stretching utilizing peripheral-speed differences among rolls, transverse stretching utilizing a tenter oven, rolling, simultaneous biaxial stretching with a combination of a tenter oven and a linear motor, and combinations of these.

The stretch ratio is not particularly limited, and is selected suitably according to the purpose and the properties of the thermoplastic resin used. For example, in the case where a propylene homopolymer or a copolymer thereof is used as the thermoplastic resin, the stretch ratio in uniaxial stretching is about 1.2-12, preferably 2-10, and that in biaxial stretching is 1.5-60, preferably 10-50, in terms of areal ratio. In the case of using other thermoplastic resins, the stretch ratio in uniaxial stretching is 1.2-10, preferably 2-5, and that in biaxial stretching is 1.5-20, preferably 4-12, in terms of areal ratio. According to need, the film is subjected further to an annealing treatment at a high temperature.

The thicknesses of the thermoplastic resin film (1) and thermoplastic resin film (2) are determined suitably according to the materials used, adherend to which the label is to be applied, intended use, use environment, storage environment, etc. The thickness of the thermoplastic resin film (1) is preferably 5-500 μm, more preferably 10-300 μm. The thickness of the thermoplastic resin film (2) is preferably 20-500 μm, more preferably 40-300 μm.

<Heat-Sealable Layer (1a)>

For constituting the heat-sealable layer (1a) employed in the label for in-mold forming of the invention, a known heat-sealable resin can be selected. The kind thereof is not particularly limited as long as the resin has the function of thermally bonding in in-molding forming to the resin material constituting the container to be labeled.

Preferred examples of the resin include ethylene resins having a melting point of 50-130° C., such as low-density to medium-density polyethylene having a density of 0.900-0.935 g/cm$^3$, linear low-density polyethylene having a density of 0.880-0.940 g/cm$^3$, ethylene/vinyl acetate copolymers, ethylene/acrylic acid copolymers, ethylene/alkyl acrylate copolymers, ethylene/alkyl methacrylate copolymers (the alkyl group has 1-8 carbon atoms), and metal salts (Zn, Al, Li, K, Na, etc.) of ethylene/methacrylic acid copolymers.

Preferred among those is high-pressure-process polyethylene having a density within that range, crystallinity (X-ray diffraction method) of 10-60%, and number-average molecular weight of 10,000-40,000 or linear polyethylene. Especially preferred among these from the standpoint of bondability to resin containers is linear polyethylene obtained by copolymerizing 40-98% by weight ethylene with 60-2% by weight α-olefin having 3-30 carbon atoms using a metallocene catalyst (in particular, a metallocene/aluminoxane catalyst or a metallocene catalyst comprising a metallocene compound, such as that disclosed in, e.g., International Publication 92/01723, and a compound reacting with the metallocene compound to form a stable anion). These ethylene resins may be used alone or as a mixture of two or more thereof. In the case where a mixture of any of those ethylene resins and other resin(s) such as, e.g., polypropylene is used, this mixture preferably contains the ethylene resin as the main component (50% by weight or larger).

Examples of methods for disposing the heat-sealable resin on the thermoplastic resin film (1) to form a heat-sealable layer (1a) include: coextrusion in which a melt of the resin for a resin layer described above (e.g., the film layer (1b)) constituting the thermoplastic resin film (1) and a melt of the heat-sealable resin adhesive are superposed in a multilayer die and extruded in a film form; extrusion laminating in which a melt of the heat-sealable resin adhesive is extruded in a film form through a T-die and superposed on the resin layer described above; and a method in which a resin solution prepared by dissolving the heat-sealable resin in a solvent such as toluene or ethyl cellosolve is applied to the resin layer described above and then dried to superpose the heat-sealable resin.

The thickness of the heat-sealable layer (1a) in this case is preferably 1-100 μm, more preferably 2-20 μm. The heat-sealable layer should be melted by the heat of a molten resin as a container material to fusion-bond and unite the label to the container. From the standpoint of obtaining sufficient adhesion strength, the thickness of the heat-sealable layer is preferably 1 μm or larger. When the thickness thereof is 100 μm or smaller, the label is less apt to curl and can be set relatively easily in a mold for in-mold forming.

An embossed design may be imparted to the surface of the heat-sealable layer (1a) by a known method. By this embossing, the phenomenon in which air inclusion occurs between the label for in-mold forming and a container to partly swell the label (blistering) can be prevented.

Known additives for resins can be added to the heat-sealable layer (1a) as desired as long as this addition does not impair the performance required for heat sealing. Examples of such additives include dyes, nucleating agents, plasticizers, release agents, antioxidants, antiblocking agents, flame retardants, ultraviolet absorbers, ultraviolet stabilizers, and antistatic agents.

As the heat-sealable resin constituting the heat-sealable layer (1a) employed in the label for in-mold forming of the invention, use may be made of a suitably selected water-based heat-sealable resin suitable for labels for in-mold forming. According to this technique, the adhesion strength of the label can be improved regardless of the kind of the thermoplastic resin forming the container. It is especially preferred to select a heat-sealable resin formed by applying a water-based coating fluid comprising a heat-sealable-resin dispersion having a phase transition temperature of 50-140° C. to the thermoplastic resin film (1) and drying the coating.

The water-based heat-sealable resin preferably comprises a dispersion of a resin having heat sealability (ability to be heat-activated) suitable for in-mold forming. Examples of the dispersion of a resin having heat sealability include ones obtained by emulsion polymerization, ones obtained by suspension polymerization, and ones obtained by mechanically pulverizing a resin with, e.g., an extruder and dispersing the resin particles in a water medium. Labels for in-mold forming having a heat-sealable layer that has been formed so as to retain the shape of particles derived from the dispersion can be prevented from suffering blistering and from sticking to each other to cause blocking.

Preferred examples of usable water-based heat-sealable resins include acrylic polymers, vinyl acetate polymers, styrene polymers, vinyl chloride polymers, vinylidene chloride polymers, ethylene resins including polyethylene, polyurethanes, polyesters, epoxy resins, petroleum resins, rosin esters, silicone resins, alkyd resins, polybutadiene, butadiene copolymers, polybutene, butyl rubber, polypropylene, polychloroprene, and polyisoprene.

Preferred among those are acrylic polymers, vinyl acetate polymers, and styrene polymers. More preferred among these are ethylene/acrylic acid copolymers, ethylene/methacrylic acid copolymers, ethylene/acrylic ester copolymers, acrylic ester polymers, ethylene/vinyl acetate copolymers, and styrene/butadiene copolymers.

The phase transition temperatures of those resin dispersions are in the range of preferably 50-140° C., more preferably 55-130° C., from the standpoint of suitability for in-mold forming. Phase transition temperatures higher than 140° tend to result in impaired low-temperature heat sealability and reduced label adhesion strength. In the case of a dispersion having a phase transition temperature lower than 50° C., it is difficult to form a heat-sealable layer retaining the shape of particles derived from the dispersion. Namely, the shape of particles disappears upon high-temperature drying and the heat-sealable resin in a smooth surface state covers the label surface. Because of this, the label thus obtained tends to suffer blistering during in-mold forming or suffer blocking during printing or label processing. When drying after the application of such a dispersion fluid is conducted at a temperature lower than the phase transition temperature so as to avoid those troubles, this tends to reduce productivity. Furthermore, there is a problem that the heat-sealable layer of this label is tacky even at ordinary temperature or such labels are apt to stick to each other to cause blocking during label storage in summer.

For applying those resin dispersions, use may be made of common coating techniques such as comma coater, roll, rod, curtain, gravure, blade, air-knife, sizing press, wire-wound bar, slide hopper, and reverse gravure coating techniques. Also usable is a method in which a suitable combination of two or more of these common coating techniques is used to apply the dispersion.

For drying after the application, a known technique may be used. However, the drying should be conducted under such conditions that the temperature does not exceed the phase transition temperature of the heat-sealable resin dispersion used.

The amount of the heat-sealable layer (1a) thus formed through application is generally preferably 0.05-30 g/m$^2$, more preferably 0.1-20 g/m$^2$, even more preferably 0.2-10 g/m$^2$, on a dry basis. In case where the amount of the layer on a dry basis is smaller than 0.05 g/m$^2$, there is a tendency that sufficient container adhesion strength cannot be obtained. In the case where the amount of the layer on a dry basis exceeds 30 g/m$^2$, there is a tendency that the coating layer surface is smooth and blistering is apt to occur, although the adhesion strength is sufficient. In addition, such a large amount poses problems, for example, that the necessary layer amount cannot be obtained through one coating operation and it is necessary to conduct a coating operation two or more times, resulting in an increased production cost.

In the case where the heat-sealable layer (1a) after application and drying covers 30-100%, preferably 40-90%, more preferably 50-80%, of the surface of the thermoplastic resin film (1), this label is suitable for in-mold forming. When the percentage of the covering is lower than 30%, the label tends to have a reduced container adhesion strength when used for in-mold forming.

It is preferred that various binder resins for improving adhesion to a resin layer described above (e.g., the film layer (1b)) constituting the thermoplastic resin film (1), an anti-blocking agent for preventing blocking after label formation, a slip agent and an antistatic agent both for improving suitability for sheet feeding/discharge during printing, and the like be added to the heat-sealable layer (1a) formed from a dispersion of a water-based heat-sealable resin.

Furthermore, a dispersant, thickener, antifoamer, antiseptic, ultraviolet absorber, ultraviolet stabilizer, antioxidant, surfactant, dye, pigment, antistatic agent, and the like can be added suitably as needed.

<Printable Layer (2a)>

It is preferred that at least one side of the thermoplastic resin film (2), which is printable, be subjected to a surface treatment to form a printable layer (2a) in order to improve printability in various printing techniques. As such a printable layer (2a), any of various layers can be used according to need, such as a surface modification layer, pigment coat layer for print quality improvement, heat-sensitive recording layer, ink-receiving layer for laser printing, ink-receiving layer for thermal transfer printing, and ink-receiving layer for ink-jet printing.

The label for in-mold forming of the invention preferably has antistatic performance on at least one side thereof as a measure against static buildup. For example, an antistatic agent may be added to the heat-sealable layer (1a), or the printable layer (2a) may contain an antistatic agent so as to combine antistatic performance and printability as will be described later.

<Surface Modification Layer>

It is preferred that at least the front side of the thermoplastic resin film (2) be subjected to a surface treatment to form a surface modification layer. One method of surface treatment comprises a combination of a surface oxidation treatment and a surface-treating agent. For the surface oxidation treatment there may be used one of or a combination of two or more of surface oxidation treatments in general use for films, such as corona discharge treatment, flame treatment, plasma treatment, glow discharge treatment, and ozone treatment. Preferred of these are corona treatment and flame treatment. The amount of energy to be used for corona treatment may be 600-12,000 J/m$^2$ (10-200 W·min/m$^2$), and is preferably 1,200-9,000 J/m$^2$ (20-150 W·min/m$^2$). That for flame treatment may be 8,000-200,000 J/m$^2$, and is preferably 20,000-100,000 J/m$^2$.

[Surface-Treating Agent]

The surface-treating agent mentioned above is either one member selected mainly from the following primers and antistatic polymers or a mixture of two or more ingredients selected mainly from these. From the standpoints of improving ink adhesion in printing and preventing static buildup, a preferred surface-treating agent comprises a primer or a combination of a primer and an antistatic polymer.

Primers: Usable primers include polyethyleneimine polymers such as polyethyleneimine, polyethyleneimines modified with an alkyl having 1-12 carbon atoms, poly(ethyleneimine-urea), ethyleneimine adducts of polyamine-polyamides, and epichlorohydrin adducts of polyamine-polyamides, acrylic ester polymers such as acrylamide/acrylic ester copolymers, acrylamide/acrylic ester/methacrylic ester copolymers, polyacrylamide derivatives, acrylic ester polymers containing oxazoline groups, and poly(acrylic ester)s, water-soluble resins such as polyvinylpyrrolidone, polyethylene glycol, and poly(vinyl alcohol) resins, and water-dispersible resins such as poly(vinyl acetate), polyurethanes, ethylene/vinyl acetate copolymers, poly(vinylidene chloride), chlorinated polypropylene, and acrylonitrile/butadiene copolymers.

Preferred among those are polyethyleneimine polymers, urethane resins, and poly(acrylic ester)s. More preferred are polyethyleneimine polymers. Even more preferred are polyethyleneimine having a degree of polymerization of 20-3,000, ethyleneimine adducts of polyamine-polyamides, and modified polyethyleneimines obtained by modifying these polyethyleneimine polymers with a halogenated alkyl, halogenated alkenyl, halogenated cycloalkyl, or halogenated benzyl group having 1-24 carbon atoms.

Antistatic Polymers: Examples of antistatic polymers include polymers of the cationic, anionic, and amphoteric types. Examples of the cationic polymers include polymers having a quaternary ammonium salt structure or phosphonium salt structure, nitrogen-containing acrylic polymers, and acrylic or methacrylic polymers having nitrogen in a quaternary ammonium salt structure. Examples of the anionic polymers include styrene/maleic anhydride copolymers or alkali metal salts thereof, alkali metal salts of ethylene/acrylic acid copolymers, and alkali metal salts of ethylene/methacrylic acid copolymers. Examples of the amphoteric polymers include acrylic or methacrylic polymers having nitrogen in a betaine structure. Especially preferred are acrylic or methacrylic polymers having nitrogen in a quaternary ammonium salt structure.

The molecular weight of such an antistatic polymer can be regulated so as to be at any desired level by controlling polymerization conditions such as polymerization temperature, kind and amount of a polymerization initiator, amount of a solvent to be used, and chain transfer agent. In general, the molecular weight of the polymer obtained is 1,000-1,000,000. Preferably, it is in the range of 1,000-500,000. The surface-treating agent mentioned above for use in the invention may contain the following optional ingredients as needed.

Optional Ingredient 1: By adding a crosslinking agent, coating film strength and water resistance can be further improved. Examples of the crosslinking agent include epoxy compounds such as glycidyl ethers and glycidyl esters, epoxy resins, and water-dispersible resins such as isocyanate, oxazoline, formalin, and hydrazide resins. The amount of the crosslinking agent to be added is generally in the range of up to 100 parts by weight per 100 parts by weight of the effective ingredients, excluding the solvent, for the surface modifier.

Optional Ingredient 2: An alkali metal salt or alkaline earth metal salt surface modifier contains an alkali metal salt or an alkaline earth metal salt. Examples of these salts include water-soluble inorganic salts such as, e.g., sodium carbonate, sodium hydrogen carbonate, potassium carbonate, sodium sulfite, and other alkaline salts, and further include sodium chloride, sodium sulfate, sodium nitrate, sodium tripolyphosphate, sodium pyrophosphate, and ammonium alum. The amount of this optional ingredient is generally up to 50 parts by weight per 100 parts by weight of the effective ingredients, excluding the solvent, for the surface modifier.

Optional Ingredients 3: The surface modifier further may contain a surfactant, antifoamer, water-soluble or water-dispersible fine powder, and other aids. The amount of such optional ingredients is generally up to 20 parts by weight per 100 parts by weight of the effective ingredients, excluding the solvent, for the surface modifier.

[Formation of Surface Modification Layer]

The ingredients for the surface modifier are used after having been dissolved in water or a hydrophilic solvent such as methyl alcohol, ethyl alcohol, or isopropyl alcohol. It is, however, preferred to use the ingredients in the form of an aqueous solution. The concentration of the solution is generally about 0.1-20% by weight, preferably about 0.1-10% by weight. For application, use may be made of a coating technique such as die, lip, roll, gravure, spray, blade, reverse-roll, air-knife, sizing press, or mayer bar coating. Smoothing is conducted as needed. In a drying step, the excess water or hydrophilic solvent is removed. The amount of the modifier applied may be 0.005-5 g/m$^2$, preferably 0.01-2 g/m$^2$, in terms of solid amount after drying.

In the case where the thermoplastic resin film forming the thermoplastic resin film layer (A) is a stretched film, the surface modification layer may be formed through one coating operation or two or more coating operations regardless of whether the film to be thus coated has undergone the longitudinal or transverse stretching or not. A layer such as a layer for imparting suitability for writing, layer for improving print quality (pigment coat layer), ink-receiving layer for thermal transfer printing, laser printing layer, heat-sensitive recording layer, or ink-receiving layer for ink-jet printing can be formed as needed on the surface of the thermoplastic resin film layer (A) by the same coating technique as for the formation of the surface modification layer after the surface treatment described above or after the formation of the surface modification layer.

<Pigment Coat Layer>

The pigment coat layer to be employed in the invention for improving print quality can be a known one generally used as a coating agent for coated paper, such as those described in detail in, e.g., JP-A-4-77530, JP-A-3-10894, and JP-A-2003-127290. The formation of this layer enables printed matters satisfactory in the adhesion, drying properties, and coloration of a printing ink to be obtained. The layer further provides capability for writing with pencils.

<Heat-Sensitive Recording Layer, Ink-Receiving Layer for Laser Printing, and Ink-Receiving Layer for Thermal Transfer Printing>

The heat-sensitive recording layer, ink-receiving layer for laser printing, and ink-receiving layer for thermal transfer printing to be employed in the invention for printing can be known ones such as those described in detail in, e.g., JP-A-9-164768. The formation of these layers enables variable information such as a bar code or trade name advantageously to be printed with a suitable printer. Thus, printed matters having high resolution and water resistance can be obtained.

<Ink-Receiving Layer for Ink-Jet Printing>

The ink-receiving layer for ink-jet printing which is to be employed in the invention can be a known one such as that described in detail, in, e.g., JP-A-9-156208. The formation of this layer enables printing advantageously to be conducted with a suitable printer. Thus, printed matters having water resistance can be obtained so as to take advantage of the water resistance of the resin films and resin container.

<Hiding Layer (2b)>

A hiding layer (2b) may be formed on at least one side of the thermoplastic resin film (2) in the invention. The hiding layer can be formed by conducting white solid printing or black solid printing in a thickness of 1-50 µm, preferably 5-40 µm, by typographic printing, offset printing, screen printing, flexography, gravure printing, or the like. The pigment coat layer may serve also as a hiding layer. For the purpose of enhancing appearance attractiveness, the hiding layer can be formed by direct vapor deposition of a metal, transfer of a vapor-deposited metal, metal foil transfer, application of a coating fluid containing metal particles, application of a coating fluid containing a pearlessence pigment, a method in which a photosensitive resin is exposed to light through an interference fringe and developed (formation of hologram), etc. Formation of such a hiding layer has advantages in that it enhances the appearance attractiveness of the label, transparent resin films are opacified, and it is possible to form the printable layer (2a) on each side of the opacified label.

<Adhesive Layer (3)>

In the label for in-mold forming of the invention, an adhesive layer (3) may be formed between the thermoplastic resin film (1) and the thermoplastic resin film (2). The adhesive layer (3) can bond the two films to each other and can embed and fix an antenna and an IC chip. The adhesive to be used for the adhesion layer (3) preferably comprises at least one member selected from a pressure-sensitive adhesive, a curing type resin adhesive, an ultraviolet-curing type adhesive, and an electron-beam-curing type adhesive. It is especially preferred to use any of a pressure-sensitive adhesive, a curing type resin adhesive, and an ultraviolet-curing type adhesive.

The higher the adhesion strength between the thermoplastic resin film (1) and the thermoplastic resin film (2), the more the label for in-mold forming is preferred from the standpoint of enhancing the water resistance, durability, and security thereof. Specifically, the adhesion strength is preferably 300 gf/25 mm or higher, more preferably 300-8,000 gf/25 mm, especially preferably 500-7,000 gf/25 mm. In the case where the adhesion strength between the film (1) and the film (2) is lower than 300 gf/25 mm, separation readily occurs. Namely, the thermoplastic resin film (2) may peel off the container and appearance deterioration due to, e.g., blistering is apt to result. In addition, there is a concern about security.

<Pressure-Sensitive Adhesive>

To use a pressure-sensitive adhesive as the adhesive layer (3) is the easiest technique in forming the label for in-mold forming of the invention. For example, an antenna and an IC chip are placed on the thermoplastic resin film (1) having a heat-sealable layer and the thermoplastic resin film (2) having a pressure-sensitive adhesive layer formed thereon beforehand is superposed on and bonded to the film (1) so that the pressure-sensitive adhesive layer embeds the antenna and the IC chip therein and is in contact with the thermoplastic resin film (1). Thus, the label for in-mold forming of the invention can be obtained.

The kind of the pressure-sensitive adhesive and the thickness thereof (amount of the adhesive layer formed by application) can be selected variously according to the kinds of the thermoplastic resin films used, environment in which the label is to be used, adhesion strength, etc. In general, the adhesive layer can be formed by applying the water-based or solvent-based pressure-sensitive adhesive used and drying the coating. Use can be made of a natural rubber, synthetic rubber, acrylic, silicone, or another adhesive. These synthetic polymer type pressure-sensitive adhesives can be used in the form of an organic-solvent solution or of a dispersion in water, such as a dispersion or emulsion.

Methods for applying a pressure-sensitive adhesive are not limited at all. Examples thereof include: a method in which the adhesive is applied directly to a thermoplastic resin film by, e.g., kiss-roll coating, die coating, bar coating, comma-roll coating, knife coating, lip-die coating, roll coating, curtain coating, gravure coating, spray coating, blade coating, reverse-roll coating, or reverse gravure coating; and the transfer method in which a pressure-sensitive adhesive layer formed by any of these techniques is transferred to a process paper.

Examples of the rubber type pressure-sensitive adhesives include polyisobutylene rubber, butyl rubber, mixtures of these, and compositions obtained by incorporating a tackifier, such as abietic acid rosin ester, terpene/phenol copolymer, or terpene/indene copolymer, into those rubber type pressure-sensitive adhesives. Examples of the acrylic pressure-sensitive adhesive include ones having a glass transition point of −20° C. or lower, such as 2-ethylhexyl acrylate/n-butyl acrylate copolymers and 2-ethylhexyl acrylate/ethyl acrylate/methyl methacrylate copolymers. It is also possible to use an adhesive containing a pigment such as titanium white for the purpose of improving the opacity of the label.

The amount of the pressure-sensitive adhesive to be applied is not particularly limited. However, it is in the range of generally 3-60 g/m$^2$, preferably 10-40 g/m$^2$, on a solid basis.

<Curing Type Resin Adhesive>

The curing type resin adhesive usable as the adhesive layer (3) generally is any of resin adhesives of the chemical-reaction-curing type which are classified into the cold-setting one-pack type, cold-setting two-pack type, etc. Once the adhesive cures, an exceedingly high adhesion strength can be obtained. Usually, this kind of adhesive can be used for pressure bonding at ordinary temperature or with heating. In the invention, a heat-curing type adhesive also can be used as long as it cures with slight heating. In general, use can be made of a composition such as a cyanoacrylate adhesive, a butyral adhesive, a silicone adhesive, a polyurethane adhesive, examples of which include polyether polyol/polyisocyanate adhesives and polyester polyol/polyisocyanate adhesives, a polyester adhesive, or an epoxy adhesive.

Specific examples of the adhesive include liquid resin adhesives. For example, a polyurethane resin adhesive such as EL-150 (trade name), manufactured by Toyo-Morton Ltd., or a mixture of BLS-2080A and BLS-2080B (trade name) (a two-pack type curable polyurethane resin adhesive, manufactured by Toyo-Morton Ltd.), or a polyester resin adhesive such as AD-503 (trade name), manufactured by the same company, can be applied. These may be applied by the same technique as for the pressure-sensitive adhesive in an amount of 0.5-25 g/m$^2$ on a dry basis to laminate the thermoplastic resin film (1) to the thermoplastic resin film (2) by the technique called dry laminating or wet laminating.

<Ultraviolet-Curing Type Adhesive>

The ultraviolet-curing type adhesive usable as the adhesive layer (3) generally is an adhesive that reacts and cures upon irradiation with ultraviolet radiation. It is easier to handle than the chemical-reaction-curing type resin adhesive, and the time period required for curing after ultraviolet irradiation is short. Once this adhesive cures, an exceedingly high adhesion strength can be obtained. This ultraviolet-curing type adhesive may have a composition comprising a urethane, polyester, or epoxy resin as a prepolymer or comprising an acrylic ester or the like as a monomer. Furthermore, usable additives include a photopolymerization initiator and a photopolymerization inhibitor, and optionally include a silicone resin. In the invention, visible-light-curing adhesives also are included in this group.

In this case, it is preferred that at least either of the thermoplastic resin film (1) and the thermoplastic resin film (2) be regulated so as to have a light transmittance in an ultraviolet region (wavelength, 380 nm) of 60% or higher and the adhesive layer (3) be irradiated with ultraviolet from the side of that film to cure the ultraviolet curing type adhesive.

<Electron-Beam-Curing Type Adhesive>

The electron-beam-curing type adhesive usable as the adhesive layer (3) generally is an adhesive that reacts and cures upon irradiation with electron beams. It is easier to handle than the chemical-reaction-curing type resin adhesive, and the time period required for curing after electron beam irradiation is short. Once this adhesive cures, exceedingly high adhesion strength can be obtained. An electron-beam-curing type adhesive can be used advantageously even when the thermoplastic resin film (1) and the thermoplastic resin film (2) are opaque resin films. The electron-beam-curing type adhesive may have a composition comprising a polyamide resin, vinyl resin, urethane resin, polyester resin, epoxy resin, or the like as a prepolymer or comprising an acrylic ester or the like as a monomer. Addition of a photopolymerization initiator or the like is not particularly necessary in the case of curing with electron beams. However, when curability is desired to be enhanced, a known photopolymerization initiator can be added.

For applying the ultraviolet-curing type adhesive and the electron-beam-curing type adhesive, the same techniques as those for the pressure-sensitive adhesive can be used advantageously. Furthermore, typographic printing, offset printing, screen printing, flexography, gravure printing, and the like also can be used advantageously.

<Antenna and IC Chip>

The antenna and IC chip (IC module) for non-contact data sending/receiving to be used in the label for in-mold forming of the invention preferably have the function of any of an RFID tag, a smart tag, and an active tag.

There are many documents concerned with an antenna and an IC chip (IC module) for non-contact data sending/receiving. The term RFID tag herein means one in which the IC chip comprises a memory card such as, in particular, PROM, EPROM, or EEPROM. Although a code for identification is recorded in these ROM's, these codes are unrewritably stored at factory, or these codes has a circuit for controlling access and become rewritable after passage of certification. The feature of these ROM's is to be able to be made exceedingly small, whereby reproduction of the features thereof including the size is difficult, so that these ROM's are less apt to be copied.

The smart tag is one in which the inner structures of the software and hardware and the data memorized are more difficult to be analyzed than in the RFID tag. In general, the smart tag comprises a CPU (also called MPU) card in which the IC chip has a built-in CPU. This card itself has computing function and, hence, cryptographic certification can be conducted between the IC chip and a reader/writer. During data reading/writing, whether the access is proper or not can be judged by the card itself. Because of this, it is exceedingly difficult for a third party to conduct fraudulent access or alteration, and high security can be realized.

Unlike contact type IC modules, the IC module for non-contact data sending/receiving cannot be supplied externally with a voltage for circuit operation. Consequently, the electromagnetic wave (electric wave or magnetic field) or microwave emitted by a reader/writer is converted electrostatically to an operating voltage to operate the circuit. However, there are cases where a sufficient operating voltage is not obtained and the operation is unstable depending on the kind of the electromagnetic wave used, distance between the IC module and the reader/writer, state of receiving, such as direction, etc. The active tag is a tag that has a long-life cell or self-generating function (e.g., power generation with light) and can operate stably even during non-access period. There are cases where the former tag is called a passive tag in contrast to the latter.

According to current techniques, the IC modules for the latter tag are larger and some of these are difficult to be embedded between films. Because of this, it is preferred to use an RFID or smart tag as the IC module in the label for in-mold forming of the invention. Especially preferably, an RFID is used.

An IC module is produced by forming an IC circuit and a wiring circuit on a circuit substrate. As the substrate material for the circuit substrate, any of the general rigid type such as a paper-phenol, glass-epoxy, BT resin, FR4, or composite substrate, the flexible type such as a polyimide film, polyester film, or polyethylene film, and the composite type comprising a combination of the two may be used according to purposes. The wiring circuit can be formed by: a method in which a metallic conductor wire in a coiled form is disposed on the substrate material with an adhesive or is disposed on the substrate material by pressing the wire against the film with heating to deform the film; a method in which the metallic part of a substrate material covered with a metal such as copper or aluminum is etched to form the circuit; a method in which a metal foil made of a conductive metal such as silver is transferred to a substrate to form the circuit; and a method in which a conductive-paste coating material is applied by silk screen printing, ink-jet printing, or the like and dried to form a wiring pattern on a substrate. The circuit may be formed directly on the thermoplastic resin film (1) or thermoplastic resin film (2).

An IC module is formed by mounting an IC circuit on the substrate on which a wiring circuit has been formed by any of those methods and electrically connecting an antenna to the IC circuit. For the mounting of an IC circuit on the substrate, use may be made of wire bonding, tape-automated bonding, chip-on-board, or flip chip bonding. Although ordinary soldering, a conductive adhesive, or ultrasonic bonding can be used for the IC circuit mounting and connection to an antenna, it is necessary to employ a processing technique conducted under temperature conditions that the circuit substrate material can withstand.

There is a small IC chip that is 0.3-0.4 mm square and 60 µm thick. This chip including the antenna easily can be embedded in the adhesive layer (3) described above. From the appearance of the label for in-mold forming obtained, the presence of the IC module cannot be easily recognized. The IC module can be used after having been embedded (packaged) in an epoxy resin or the like for the purpose of protecting the IC circuit mounted and the wiring circuit. In this case, the thickness of the IC module as measured after embedding in an epoxy resin or the like may be from 150 µm to 1 mm.

<Formation of Label for In-Mold Forming>

For forming the label for in-mold forming of the invention, use may be made of a method that comprises forming an adhesive layer (3) on a surface of either of the thermoplastic resin film (1) and the thermoplastic resin film (2), subsequently mounting an IC chip and an antenna on the adhesive, and laminating the remaining film thereto. In this method, it is preferred to use dry laminating when both the thermoplastic resin film (1) and the thermoplastic resin film (2) used are in a roll form. When one of the films is in a sheet form, it is preferred to use print laminating. When both are in a sheet form, it is preferred to use hot-press laminating. It is also possible to laminate the sheets to each other manually.

In laminating by any of those methods, printing on the thermoplastic resin film (2) may be conducted either before the formation of the label for in-mold forming (before laminating) or after the formation thereof (after laminating).

<Thermoplastic Resin Container>

The label for in-mold forming of the invention can be used on containers made of various resins. For example, it can be used on containers made of high-density polyethylene, polypropylene, polyesters, polystyrene, poly(vinyl chloride), polycarbonates, etc. The label is suitable for containers made of high-density polyethylene, polypropylene, polyesters, and polystyrene among those resins. The label for in-mold forming of the invention is united and bonded to such a container when the container is formed in a mold. Thus, a thermoplastic resin container is provided.

In the invention, the adhesion strength between the thermoplastic resin container and the label for in-mold forming is preferably 300 gf/25 mm or higher, more preferably 300-8,000 gf/25 mm, especially preferably 500-7,000 gf/25 mm. In the case where the adhesion strength between the label for in-mold forming and the container is lower than 300 gf/25 mm, separation readily occurs and the label for in-mold forming peels off the container. The function of the label is insufficient.

The thermoplastic resin container of the invention is produced in a mold by at least one technique selected from injection molding, blow molding, pressure-difference molding, and expansion molding. The container is suitable for injection molding, blow molding, and pressure-difference molding among those.

EXAMPLES

Features of the invention will be explained below in more detail by reference to Examples. The materials, used amounts, proportions, treatment methods, treatment procedures, etc. shown in the Examples can be modified suitably as long as the modifications do not depart from the spirit of the invention. Consequently, the scope of the invention should not be construed as being limited by the following Examples in any way.

In the invention, the values of properties and the ranges thereof were determined by the following methods.

Thickness: JIS-P-8118 (1998)
Density: JIS-P-8124 (1998)
Whiteness: JIS-P-8148 (2001)
Porosity: Determined with the following equation.

Porosity (%)=$[(\rho_0-\rho)/\rho_0]\times 100$ (In the equation, $\rho_0$ is the true density of the film and $\rho$ is the density of the film).

Thermal conductivity: Measured by the probe method with thermal conductivity meter "QTM-D3" (trade name), manufactured by Kyoto Electronics Manufacturing Co., Ltd.

Degree of heat shrinkage: The degree of heat shrinkage of a thermoplastic resin film was determined by cutting the film into a 100-mm square, measuring the actual dimensions thereof in a thermo-hygrostatic room having an air temperature of 23° C. and a relative humidity of 50%, subsequently heat-treating the film for 30 minutes in a 120° C. circulation oven, taking out the film, allowing this film to cool by placing it again in the thermo-hygrostatic room for 1 hour, and then measuring the actual dimensions of the cooled film and comparing these with those before the heat treatment in the oven to calculate the dimensional change.

Opacity: Opacity was determined by the method as provided for in JIS P-8138, by dividing a value obtained in a measurement in which a black board was placed on the back of a sample by a value obtained in a measurement in which a white board was placed on the back of the sample. The quotient was expressed in terms of percentage.

Production Example 1

Production of Thermoplastic Resin Film (1) Having Heat-Sealable Layer (1a)

A composition (1b) prepared by incorporating 15% by weight calcium carbonate having an average particle diameter of 1.5 μm into a mixture of 80% by weight propylene homopolymer having a melt flow rate (MFR; 230° C., 2.16 kg load) of 0.8 g/10 min and 5% by weight high-density polyethylene was kneaded with an extruder having a set temperature of 270° C. Thereafter, the composition was extruded into a sheet form through a T-die, and the extrudate was cooled with a cooler to obtain an unstretched sheet. Subsequently, this unstretched sheet was heated to a temperature of 140° C. and then longitudinally stretched in a stretch ratio of 4 by means of peripheral-speed differences among rolls to obtain a longitudinally stretched sheet having a stretch ratio of 4.

A composition (1c) for surface layer formation prepared by mixing 55% by weight propylene homopolymer having an MFR of 4 g/10 min with 45% by weight calcium carbonate having an average particle diameter of 1.5 μm was kneaded with an extruder having a set temperature of 270° C. The kneaded composition was extruded to obtain a sheet, which was laminated to one side of the sheet longitudinally stretched in a stretch ratio of 4 obtained in the step described above.

A mixture of 70% by weight ethylene/1-hexene copolymer obtained by copolymerizing ethylene and 1-hexene using a metallocene catalyst and having an MFR of 18 g/10 min, density of 0.898 g/cm$^3$, and melting point of 90° C. (1-hexene content, 22% by weight; crystallinity, 30%; number-average molecular weight, 23,000) and 30% by weight high-pressure-process low-density polyethylene having an MFR of 4 g/10 min, density of 0.92 g/cm$^3$, and melting point of 110° C. was mixed by means of a tumbling mixer for 3 minutes. This mixture was extruded through a die into strands and cut to obtain pellets (1a) for a heat-sealable layer.

This pelletized material and a composition (1d) having the same makeup as (1c) were separately melt-kneaded at 250° C. with respective extruders and supplied to one co-extrusion die. In this die, the two melts were superposed at 230° C. and then laminated to the other side of the longitudinally stretched sheet having a stretch ratio of 4 obtained in that step so that the layer (1a) faced outward.

This four-layer film was introduced into a tenter oven, in which the film was reheated to 155° C., subsequently stretched in the transverse direction in a stretch ratio of 8, and then subjected to an annealing at 160° C. Thereafter, the film was cooled to 55° C. and trimmed. Furthermore, the surface layer (1c) side was subjected to corona discharge treatment at 70 W/m$^2$/min. Thus, a thermoplastic resin film (1) having a heat-sealable layer (1a) was obtained, which had a density of 0.80 g/cm$^3$ and a four-layer structure (1c/1b/1d/1a=uniaxially stretched/biaxially stretched/uniaxially stretched/uniaxially stretched) having a thickness of 100 μm (thicknesses of the layers (1c/1b/1d/1a)=15/70/10/5 μm).

This film had a whiteness of 96%, porosity of 35%, thermal conductivity of 0.115 W/m·K, degree of heat shrinkage of 3.5%, and opacity of 95%.

Production Example 2

Production of Thermoplastic Resin Film (1) Having Heat-Sealable Layer (1a)

A composition (1b) prepared by incorporating 1% by weight calcium carbonate having an average particle diameter of 1.5 μm into a mixture of 94% by weight propylene homopolymer having a melt flow rate (MFR; 230° C., 2.16 kg load) of 0.8 g/10 min and 5% by weight high-density polyethylene was kneaded with an extruder having a set temperature of 270° C. Thereafter, the composition was extruded into a sheet form through a T-die, and the extrudate was cooled with a cooler to obtain an unstretched sheet. Subsequently, this unstretched sheet was heated to a temperature of 140° C. and then longitudinally stretched in a stretch ratio of 4 by means of peripheral-speed differences among rolls to obtain a longitudinally stretched sheet having a stretch ratio of 4.

A composition (1c) for surface layer formation prepared by mixing 99% by weight propylene homopolymer having an MFR of 4 g/10 min with 1% by weight calcium carbonate having an average particle diameter of 1.5 μm was kneaded with an extruder having a set temperature of 270° C. The kneaded composition was extruded to obtain a sheet, which was laminated to one side of the sheet longitudinally stretched in a stretch ratio of 4 obtained in the step described above.

A mixture of 70% by weight ethylene/1-hexene copolymer obtained by copolymerizing ethylene and 1-hexene using a metallocene catalyst and having an MFR of 18 g/10 min, density of 0.898 g/cm$^3$, and melting point of 90° C. (1-hexene content, 22% by weight; crystallinity, 30%; number-average molecular weight, 23,000) and 30% by weight high-pressure-process low-density polyethylene having an MFR of 4 g/10 min, density of 0.92 g/cm$^3$, and melting point of 110° C. was mixed by means of a tumbling mixer for 3 minutes. This mixture was extruded through a die into strands and cut to obtain pellets (1a) for a heat-sealable layer.

This pelletized material and a composition (1d) having the same makeup as (1c) were separately melt-kneaded at 250° C. with respective extruders and supplied to one co-extrusion die. In this die, the two melts were superposed at 230° C. and then laminated to the other side of the longitudinally stretched sheet having a stretch ratio of 4 obtained in that step so that the layer (1a) faced outward.

This four-layer film was introduced into a tenter oven, in which the film was reheated to 170° C., subsequently stretched in the transverse direction in a stretch ratio of 8, and then subjected to an annealing at 172° C. Thereafter, the film was cooled to 55° C. and trimmed. Furthermore, the surface layer (1c) side was subjected to corona discharge treatment at 70 W/m$^2$/min. Thus, a thermoplastic resin film (1) having a heat-sealable layer (1a) was obtained, which had a density of 0.91 g/cm$^3$ and a four-layer structure (1c/1b/1d/1a=uniaxially stretched/biaxially stretched/uniaxially stretched/uniaxially stretched) having a thickness of 75 μm (thicknesses of the layers (1c/1b/1d/1a)=17/41/12/5 μm).

This film had a whiteness of 89%, porosity of 1%, thermal conductivity of 0.135 W/m·K, degree of heat shrinkage of 2.3%, and opacity of 15%.

Production Example 3

A composition (A) prepared by incorporating 25% by weight calcium carbonate having an average particle diameter of 1.5 μm into a mixture of 65% by weight propylene homopolymer having a melt flow rate (MFR) of 0.8 g/10 min and 10% by weight high-density polyethylene, a composition (B) prepared by mixing 99% by weight propylene homopolymer having a melt flow rate (MFR) of 4 g/10 min with 1% by weight titanium dioxide, and a composition (C) having the same makeup as the composition (B) were separately melt-kneaded at 250° C. with three respective extruders. Thereafter, the melts were supplied to one co-extrusion die, superposed within the die (B/A/C), subsequently extruded into a sheet form, and then cooled to about 60° C. with a cooling roll to thereby obtain a laminate film.

This laminate film was reheated to 145° C., subsequently longitudinally stretched in a stretch ratio of 5 by means of peripheral-speed differences among many rolls, and then reheated to about 150° C. and stretched in the transverse direction with a tenter in a stretch ratio of 8.5. Thereafter, the film was annealed at 160° C., subsequently cooled to 60° C., and then trimmed. Thus, a laminate film was obtained, which had a three-layer structure (B/A/C=biaxially stretched/biaxially stretched/biaxially stretched) and a thickness of 100 μm (3 μm/94 μm/3 μm). This film was a biaxially stretched film having a density of 0.66 g/cm$^3$, whiteness of 96%, porosity of 40%, thermal conductivity of 0.091 W/m·K, degree of heat shrinkage of 2.5%, and opacity of 90%.

Production Example 4

A composition (1c) prepared by incorporating 16% by weight calcium carbonate having an average particle diameter of 1.5 μm into a mixture of 81% by weight propylene homopolymer having a melt flow rate (MFR) of 0.8 g/10 min and 3% by weight high-density polyethylene was kneaded with an extruder having a set temperature of 270° C. Thereafter, the composition was extruded into a sheet form, and the extrudate was cooled with a cooler to obtain an unstretched sheet. Subsequently, this sheet was heated again to a temperature of 160° C. and then longitudinally stretched in a stretch ratio of 5 to obtain a longitudinally stretched sheet having a stretch ratio of 5.

A composition (1d) for surface layer formation prepared by mixing 54% by weight propylene homopolymer having an MFR of 4 g/10 min with 46% by weight calcium carbonate having an average particle diameter of 1.5 μm was kneaded with an extruder having a set temperature of 210° C. The composition kneaded was extruded into a sheet form through a die, and this sheet was laminated to each side of the sheet longitudinally stretched in a stretch ratio of 5 obtained in the step described above to thereby obtain a laminate film having a three-layer structure. Subsequently, this laminate film having a three-layer structure was cooled to a temperature of 60° C., subsequently heated again to a temperature of about 160° C., and then stretched in the transverse direction with a tenter in a stretch ratio of 7.5. The film stretched was annealed at a temperature of 165° C., cooled to a temperature of 60° C., and trimmed. Thus, a laminate film was obtained, which had a three-layer structure (1d/1c/1d=uniaxially stretched/biaxially stretched/uniaxially stretched) and a thickness of 80 μm (1d/1c/1d=17 μm/46 μm/17 μm). This film was a stretch laminate film having a density of 1.02 g/cm$^3$, whiteness of 94%, porosity of 29%, degree of heat shrinkage of 1.2%, and opacity of 72%.

Production Example 5

A composition prepared by incorporating 1% by weight calcium carbonate having an average particle diameter of 1.5 μm into a mixture of 96% by weight propylene homopolymer having a melt flow rate (MFR) of 0.8 g/10 min and 3% by weight high-density polyethylene was kneaded with an extruder having a set temperature of 270° C. Thereafter, the composition was extruded into a sheet form, and the extrudate was cooled with a cooler to obtain an unstretched sheet. Subsequently, this sheet was heated again to a temperature of 180° C. and then longitudinally stretched in a stretch ratio of 5. The sheet was then annealed at 182° C. to obtain a uniaxially stretched film.

This uniaxially stretched film was cooled to a temperature of 60° C. Thus, a uniaxially stretched film was obtained which had a thickness of 80 μm, density of 0.90 g/cm³, porosity of 0.5%, degree of heat shrinkage of 1.0%, and opacity of 10%.

Production Example 6

Production of Thermoplastic Resin Film (1) Having Heat-Sealable Layer (1a)

A resin dispersion composed of 45% by weight ethylene/methacrylic acid copolymer having a phase transition temperature of 90° C. and an average particle diameter of 0.7 μm (trade name, AQUATEX AC-3100; manufactured by Chuo Rika Kogyo Corp.), 5% by weight ethylene/methyl methacrylate copolymer having a phase transition temperature of 108° C. (trade name, RIKABOND ES-90; manufactured by Chuo Rika Kogyo Corp.), and 50% by weight water was applied to one side of the biaxially stretched film obtained in Production Example 3. This application was conducted with a slot die coater at a line speed of 20 m/min in an amount of 4 g/m² on a dry basis, and the coating was dried with an oven having a length of 10 m and a set drying temperature of 80° C. Thus, a thermoplastic resin film (1) was obtained that had a heat-sealable layer (1a) formed from the water-based heat-sealable resin.

Production Example 7

Production of Thermoplastic Resin Film (1) Having Heat-Sealable Layer (1a)

A thermoplastic resin film (1) having a heat-sealable layer (1a) was obtained in the same manner as in Production Example 6, except that the stretched laminate film obtained in Production Example 4 was used.

Production Example 8

Production of Thermoplastic Resin Film (1) Having Heat-Sealable Layer (1a)

A thermoplastic resin film (1) having a heat-sealable layer (1a) was obtained in the same manner as in Production Example 6, except that the uniaxially stretched film obtained in Production Example 5 was used.

Production Example 9

Production of Printable Thermoplastic Resin Film (2)

A composition (2c) prepared by incorporating 16% by weight calcium carbonate having an average particle diameter of 1.5 μm into a mixture of 81% by weight propylene homopolymer having a melt flow rate (MFR) of 0.8 g/10 min and 3% by weight high-density polyethylene was kneaded with an extruder having a set temperature of 270° C. Thereafter, the composition was extruded into a sheet form, and the extrudate was cooled with a cooler to obtain an unstretched sheet. Subsequently, this sheet was heated again to a temperature of 150° C. and then longitudinally stretched in a stretch ratio of 5 to obtain a longitudinally stretched sheet having a stretch ratio of 5.

A composition (2d) for surface layer formation prepared by mixing 54% by weight propylene homopolymer having an MFR of 4 g/10 min with 46% by weight calcium carbonate having an average particle diameter of 1.5 μm was kneaded with an extruder having a set temperature of 210° C. The kneaded composition was extruded into a sheet form through a die, and this sheet was laminated to each side of the sheet longitudinally stretched in a stretch ratio of 5 obtained in the step described above to thereby obtain a laminate film having a three-layer structure. Subsequently, this laminate film having a three-layer structure was cooled to a temperature of 60° C., subsequently heated again to a temperature of about 155° C., and then stretched in the transverse direction with a tenter in a stretch ratio of 7.5. The film stretched was annealed at a temperature of 165° C., cooled to a temperature of 60° C., and trimmed. Thus, a laminate film was obtained, which had a three-layer structure (2d/2c/2d=uniaxially stretched/biaxially stretched/uniaxially stretched) and a thickness of 60 μm (2d/2c/2d=10 μm/40 μm/10 μm). This film was a stretch laminate film having a density of 0.79 g/cm³, whiteness of 96%, porosity of 32%, degree of heat shrinkage of 1.9%, and opacity of 87%.

A surface modification layer was formed by the following method as a printable layer (2a) on each side of the stretched laminate film obtained.

<Surface Oxidation Treatment>

Both sides of the thermoplastic resin film (2) were subjected to corona discharge treatment in the following manner. Corona discharge treatment apparatus HFS 400F, manufactured by Kasuga Electric Works Ltd., and an aluminum electrode were used. A silicone-coated roll was used as a treater roll. The treatment was conducted at an electrode/roll gap of 2 mm, line speed of about 30 m/min, and applied-energy density of 50 W·min/m².

<Formation of Surface Modification Layers>

Thereafter, a surface-treating agent prepared by the method shown below was applied to both sides of the thermoplastic resin film (2) that had undergone the corona discharge treatment, in an amount of 0.06 g/m² on a dry basis on each side. The coating was dried in an oven at a temperature of about 65° C. for tens of seconds, and the film coated was wound up. Thus, a printable thermoplastic resin film (2) was obtained. The resin film (2) was equal in the degree of heat shrinkage and opacity to the stretched laminate film.

<Preparation of Surface-Treating Agent>

Production of Primer:

Into a four-necked flask equipped with a stirrer, reflux condenser, thermometer, and introduction tube for nitrogen displacement were introduced 100 parts of a 25% by weight aqueous solution of polyethyleneimine "EPOMIN® P-1000 (degree of polymerization, 1,600)" (trade name; manufactured by Nippon Shokubai Co., Ltd.), 10 parts of n-butyl chloride, and 10 parts of propylene glycol monomethyl ether. In a nitrogen stream, the resultant mixture was stirred to conduct a modification reaction for 20 hours at a temperature of 80° C. Thus, a primer comprising an aqueous solution of a butyl-modified polyethyleneimine was obtained that had a solid content of 20% by weight.

Production of Antistatic Polymer:

Into a four-necked flask equipped with a stirrer, reflux condenser, thermometer, and introduction tube for nitrogen displacement were introduced 35 parts of dimethylaminoethyl methacrylate, 20 parts of ethyl methacrylate, 20 parts of cyclohexyl methacrylate, 25 parts of stearyl methacrylate, 150 parts of ethyl alcohol, and 1 part of azobisisobutyronitrile. In a nitrogen stream, a polymerization reaction was conducted for 6 hours at a temperature of 80° C. Subsequently, 70 parts of a 60% aqueous solution of 3-chloro-2-hydroxypropyltrimethylammonium chloride was added thereto, and the resultant mixture was reacted further for 15 hours at a temperature of 80° C. Thereafter, the ethyl alcohol was distilled off while dropping water. Thus, an antistatic polymer comprising a quaternary ammonium salt type copolymer was obtained that had a final solid content of 20% by weight.

Production of Optional Ingredient 1:

The following was used as a polyamine-polyamide/epichlorohydrin adduct.

"WS-570" (trade name), manufactured by Japan PMC Corp.; solid content, 25% by weight The ingredients produced above were incorporated into a water medium in such proportions that the amounts of the primer, antistatic polymer, and optional ingredient 1 were 0.5 parts, 0.5 parts, and 0.5 parts, respectively, per 100 parts of the surface-treating agent being produced. The resultant mixture was stirred sufficiently to obtain a surface-treating agent.

Production Example 10

Production of Printable Thermoplastic Resin Film (2)

One side of the printable thermoplastic resin film (2) obtained in Production Example 9 was further subjected to a solid black printing by offset printing to form a hiding layer (2b). This film had an opacity of 100%.

Production Example 11

Production of Printable Thermoplastic Resin Film (2)

A coating fluid for forming an ink-receiving layer for thermal transfer printing that had the following composition was applied by wire bar coating in a thickness of 4 μm on a dry basis to one side of the biaxially stretched film obtained in Production Example 3. The coating was dried to form a printable layer (2a). Thus, a printable thermoplastic resin film (2) was obtained. This film had the same degree of heat shrinkage as the biaxially stretched film and had an opacity of 95%.

<Composition of Coating Fluid for Forming Ink-Receiving Layer for Thermal Transfer Printing>

The following ingredients were mixed together to prepare a coating fluid for forming an ink-receiving layer for thermal transfer printing.

| | |
|---|---|
| TOYOBO VYLON® 200 (saturated polyester manufactured by Toyobo Co., Ltd.; TK = 67° C.) | 5.3 parts by weight |
| TOYOBO VYLON® 290 (saturated polyester manufactured by Toyobo Co., Ltd.; TK = 77° C.) | 5.3 parts by weight |
| VINYLITE VYHH (vinyl chloride copolymer manufactured by Union Carbide Corp.) | 4.5 parts by weight |
| Titanium oxide (KA-10, manufactured by Titan Kogyo K.K.) | 1.5 parts by weight |
| KF-393 (amino-modified silicone oil manufactured by Shin-Etsu Silicone) | 1.1 part by weight |
| X-22-343 (epoxy-modified silicone oil manufactured by Shin-Etsu Silicone) | 1.1 part by weight |
| Toluene | 30 parts by weight |
| Methyl ethyl ketone | 30 parts by weight |
| Cyclohexanone | 22 parts by weight |

Production Example 12

Production of IC Chip and Antenna

An isocyanate-containing solvent-based silver paste was applied by silk screen printing to one side of a polyester film having a thickness of 125 μm to print an antenna circuit. The paste applied was dried with hot air. This film subsequently was allowed to stand in an 80° C. thermostatic chamber for 3 hours and then taken out. Thereafter, an IC chip (thickness, 60 μm) was mounted on the antenna, and the surface was embedded with an epoxy resin. Thus, an IC module (thickness, 300 μm) comprising the IC chip and antenna and having the function of an RFID was obtained.

Example 1

A one-pack type curable adhesive (trade name, TM265; manufactured by Toyo-Morton Ltd.) was applied in an amount of 20 g/m² on a solid basis to one side of the printable thermoplastic resin film (2) obtained in Production Example 9. Thereafter, the adhesive applied was dried to form an adhesive layer (3). The IC chip and antenna obtained in Production Example 12 were mounted on the adhesive layer (3). The thermoplastic resin film (1) having a heat-sealable layer (1a) obtained in Production Example 1 was superposed on the adhesive layer (3) on the thermoplastic resin film (2) so that the surface layer (1c) side of the film (1) was in contact with the adhesive (3). The film (1) was bonded to the film (2) with a press-bonding roll to obtain a label for in-mold forming of the invention.

The adhesion strength between the thermoplastic resin film (1) and the thermoplastic resin film (2) was 5,000 gf/25 mm.

Example 2

An ultraviolet-curable adhesive (trade name, UV SPA; manufactured by Teikoku Ink Mfg. Co., Ltd.) was applied in an amount of 20 g/m² on a solid basis to the hiding layer (2b) side of the printable thermoplastic resin film (2) obtained in Production Example 10. Thereafter, the IC chip and antenna obtained in Production Example 12 were mounted thereon. The thermoplastic resin film (1) having a heat-sealable layer (1a) obtained in Production Example 2 was superposed on the adhesive on the thermoplastic resin film (2) so that the surface layer (1c) side of the film (1) was in contact with the adhesive. The film (1) was bonded to the film (2) with a press-bonding roll. Subsequently, the resultant laminate was irradiated with ultraviolet using an ultraviolet irradiator from the thermoplastic resin film (1) side. This ultraviolet irradiation was conducted with a metal halide lamp at an output of 280 W/cm. The intensity of ultraviolet in this operation was 2,100 mW/cm². The ultraviolet irradiation width was 77 mm and the line speed was 40 m/min. The integrated quantity of ultraviolet was hence 242 mJ/cm². The ultraviolet-curable adhesive was cured under such curing conditions to form an adhesive layer (3). Thus, a label for in-mold forming of the invention was obtained.

The adhesion strength between the thermoplastic resin film (1) and the thermoplastic resin film (2) was 4,000 gf/25 mm.

Example 3

An acrylic pressure-sensitive adhesive (trade name, "ORIBAIN® BPS-1109" (a pressure-sensitive adhesive)

manufactured by Toyo Ink Mfg. Co., Ltd., which is known as TOYO INK SC HOLDINGS CO., LTD. since April 2011) was applied in an amount of 25 g/m² on a solid basis to the side of the printable thermoplastic resin film (2) obtained in Production Example 11 that was opposite to the printable layer (2a). Thereafter, the adhesive applied was dried to form an adhesive layer (3). The IC chip and antenna obtained in Production Example 12 were mounted on the adhesive layer (3). The thermoplastic resin film (1) having a heat-sealable layer (1a) obtained in Production Example 6 was superposed on the adhesive (3) on the thermoplastic resin film (2) so that the adhesive (3) was in contact with the side of the film (1) that was opposite to the heat-sealable layer (1a). The films were bonded to each other with a press-bonding roll to obtain a label for in-mold forming of the invention.

The adhesion strength between the thermoplastic resin film (1) and the thermoplastic resin film (2) was 800 gf/25 mm.

Example 4

A two-pack type curable polyurethane resin adhesive (trade names, BLS-2080A and BLS-2080B) manufactured by Toyo-Morton Ltd. was applied in an amount of 25 g/m² (on a solid basis) to the side of the thermoplastic resin film (1) having a heat-sealable layer (1a) obtained in Production Example 7 that was opposite to the heat-sealable layer (1a). Thus, an adhesive layer (3) was formed. The IC chip and antenna obtained in Production Example 12 were mounted on the adhesive layer (3). The printable thermoplastic resin film (2) obtained in Production Example 11 was superposed on the adhesive layer (3) so that the ink-receiving layer for thermal transfer printing (printable layer (2a)) faced outward. The two films were bonded to each other with a press-bonding roll to obtain a label for in-mold forming of the invention.

The adhesion strength between the thermoplastic resin film (1) and the thermoplastic resin film (2) after adhesive curing was 6,000 gf/25 mm.

Example 5

A label for in-mold forming of the invention was produced in the same manner as in Example 2, except that the thermoplastic resin film (1) having a heat-sealable layer (1a) to be used was replaced with that obtained in Production Example 8.

The adhesion strength between the thermoplastic resin film (1) and the thermoplastic resin (2) was 4,000 gf/25 mm.

Examples 6 to 8

The labels for in-mold forming obtained in Examples 1 to 3 were cut by punching into a label size (width, 70 mm; length, 90 mm). Each label was supplied with an automatic label feeder to one of the halves of a mold for blow molding. The label was fixed to the mold half with suction so that the printing side was in contact with the mold. Thereafter, a parison of high-density polyethylene (melting point, 134° C.) was formed by melt extrusion at 200° C. Subsequently, the mold halves were closed, and air pressurized to 4.2 kg/cm² was then introduced into the parison to expand the parison. The parison thus was brought into intimate contact with the mold to form a container shape and fusion-bonded to the label for in-mold forming. Subsequently, the mold was cooled and then opened to obtain a thermoplastic resin container comprising a hollow container having the label bonded thereto.

The adhesion strengths between the labels for in-mold forming and the container were 800, 830, and 350 gf/25 mm, respectively.

Examples 9 and 10

The labels for in-mold forming obtained in Examples 4 and 5 were cut by punching into a label size (width, 70 mm; length, 90 mm). Each label was supplied with an automatic label feeder to one of the halves of a mold for injection molding. The label was fixed to the mold half with suction so that the printing side was in contact with the mold. After the mold was closed, high-density polyethylene (melting point, 134° C.) was melt-extruded and injection-molded into a container shape and, simultaneously therewith, fusion-bonded to the label for in-mold forming. Subsequently, the mold was cooled and then opened to obtain a thermoplastic resin container (case for drinks) comprising a container having the label bonded thereto. The adhesion strengths between the labels for in-mold forming and the container were 350 and 370 gf/25 mm, respectively.

<Evaluation>

Using an offset press (model DAIYA II, manufactured by Mitsubishi Heavy Industries, Ltd.), characters and other images were printed with a UV offset ink (trade name, BEST CURE 161S; manufactured by T&K TOKA Co.) on the printable layer of each of the labels for in-mold forming obtained in Examples 1 to 5. These labels could be fed/discharged on the press satisfactorily. Subsequently, these labels were cut by punching to obtain labels for in-mold forming that had a width of 70 mm and a length of 90 mm. The labels thus obtained and the containers obtained by the methods according to Examples 6 to 10 had water resistance and caused no trouble even in a refrigerating environment. The function of each IC module also suffered no trouble.

The labels for in-mold forming obtained in Examples 3 and 4 were cut by punching into a size having a width of 70 mm and a length of 90 mm. A bar code and other images were printed on the printable layer of each cut label using printer "BAR CODE PRINTER B-30-S5" (trade name), manufactured by Tec Co., and heat fusion type ink ribbon "WAX TYPE FTR" (trade name), manufactured by Fujicopian Co., Ltd. The labels thus obtained and the containers obtained by the methods according to Examples 8 and 9 had water resistance and caused no trouble even in a refrigerating environment. The function of each IC module also suffered no trouble. While the invention has been described in detail and with reference to specific embodiments thereof, it will be apparent to one skilled in the art that various changes and modifications can be made therein without departing from the spirit and scope thereof.

This application is based on a Japanese patent application filed on Jun. 30, 2004 (Application No. 2004-192600), the contents thereof being herein incorporated by reference.

INDUSTRIAL APPLICABILITY

The invention is intended to protect an IC module from heat, pressure, and static buildup during label formation, printing, and in-mold forming, and is usable in the field of a label for in-mold forming that has an IC module disposed therein and is capable of eliminating troubles in production. The invention is usable also in the field of thermoplastic resin containers bearing the label.

This label for in-mold forming has the function of an IC label, has a surface which is printable, and is free from the concern about security that the IC chip and antenna disposed therein may be seen through. Furthermore, when the label is formed or subjected to a processing such as printing and when the label is bonded to a thermoplastic resin container, the IC chip and antenna disposed therein are not damaged by the processing.

In addition, since the thermoplastic resin container obtained and the label united therewith are excellent in strength, water resistance, and adhesion strength, they are usable in both indoor and outdoor applications and even in water. The labeled container can be used as containers for frozen foods, industrial products, and various containers for chemicals, in manufacturing process control applications and physical distribution management applications, and as tote boxes, etc.

The invention claimed is:

1. A label for in-mold forming, comprising:
   a first thermoplastic resin film having a heat-sealable layer;
   a second thermoplastic resin film that is printable;
   an adhesive layer comprising at least one adhesive selected from the group consisting of an ultraviolet-curing adhesive and an electron-beam-curing adhesive; and
   an antenna and an IC chip for data sending/receiving, the antenna and the IC chip being interposed between the first thermoplastic resin film and the second thermoplastic resin film,
   wherein the adhesive layer is formed between the first thermoplastic resin film and the second thermoplastic resin film,
   wherein the adhesive layer obtains adhesiveness that bonds the first thermoplastic resin film and the second thermoplastic resin film together, by curing the at least one adhesive selected from the group consisting of the ultraviolet-curing adhesive and the electron-beam-curing adhesive in the adhesive layer with ultraviolet light or with an electron beam, respectively, while the adhesive layer contacts the first thermoplastic resin film and the second thermoplastic resin film,
   wherein the first thermoplastic resin film has a film layer having voids therein,
   porosity of the first thermoplastic resin film as determined using a following equation is 1-60%, and
   the thermal conductivity of the first thermoplastic resin film is 0.05 to 0.15 W/m·K:
   Porosity (%)=$[(\rho_0-\phi/\rho_0] \times 100$, wherein $\rho_0$ is a true density of the first thermoplastic resin film, and $\rho$ is a density of the first thermoplastic resin film, and
   wherein the heat-sealable layer comprises a heat-sealable resin comprising an ethylene resin having a melting point of 50-130° C.

2. The label for in-mold forming of claim 1, wherein the film layer has been stretched at least uniaxially.

3. The label for in-mold forming of claim 1, wherein the first thermoplastic resin film and the second thermoplastic resin film have a degree of heat shrinkage of 0-5%.

4. The label for in-mold forming of claim 1, wherein at least one of the first thermoplastic resin film, the second thermoplastic resin film, and the label for in-mold forming as a whole has opacity of 70-100%.

5. The label for in-mold forming of claim 1, wherein adhesion strength between the first thermoplastic resin film and the second thermoplastic resin film is 300 gf/25 mm or higher.

6. The label for in-mold forming of claim 1,
   wherein at least one of the first thermoplastic resin film and the second thermoplastic resin film has light transmittance, as measured at a wavelength of 380 nm, of 60% or higher, and
   the adhesive layer comprises an ultraviolet-curing adhesive.

7. The label for in-mold forming of claim 1, wherein the second thermoplastic resin film has a printable layer on at least one side thereof.

8. The label for in-mold forming of claim 7, wherein the printable layer comprises printed information comprising either a bar code or a two-dimensional bar code.

9. The label for in-mold forming of claim 1, wherein the second thermoplastic resin film has a hiding layer on at least one side thereof.

10. The label for in-mold forming of claim 9, wherein the hiding layer comprises at least one member selected from the group consisting of a thin metal film, a white pigment coat, a white solid printing, and a black solid printing.

11. The label for in-mold forming of claim 1, wherein at least one of the first thermoplastic resin film and the second thermoplastic resin film comprises a crystalline polyolefin resin.

12. The label for in-mold forming of claim 11, wherein the crystalline polyolefin resin is a propylene resin.

13. The label for in-mold forming of claim 1, wherein at least one of the first thermoplastic resin film and the second thermoplastic resin film comprises at least one material selected from the group consisting of inorganic fine powders and organic fillers.

14. The label for in-mold forming of claim 1, wherein the heat-sealable layer is one formed by applying a water-based coating fluid comprising a heat-sealable resin dispersion having a phase transition temperature of 50-140° C. to the first thermoplastic resin film and drying the applied coating fluid.

15. The label for in-mold forming of claim 1, wherein the antenna and IC chip for data sending/receiving have at least one function selected from the group consisting of an RFID, a smart tag, and an active tag.

16. The label for in-mold forming of claim 1, wherein at least one side of the label has antistatic performance.

17. The label for in-mold forming of claim 1, wherein the first thermoplastic resin film has a thickness of 5-500 μm.

18. The label for in-mold forming of claim 17, wherein the first thermoplastic resin film has a thickness of 10-300 μm.

19. The label for in-mold forming of claim 1, wherein the second thermoplastic resin film has a thickness of 20-500 μm.

20. The label for in-mold forming of claim 19, wherein the second thermoplastic resin film has a thickness of 40-300 μm.

21. A thermoplastic resin container bearing the label for in-mold forming of claim 1 integrally bonded thereto by in-mold forming.

22. The thermoplastic resin container of claim 21,
    wherein adhesion strength between the thermoplastic resin container and the label for in-mold forming is 300 gf/25 mm or higher.

23. The thermoplastic resin container of claim 21, which is molded in a mold by at least one method selected from the group consisting of injection molding, blow molding, pressure-difference forming, and expansion molding.

24. A method of forming a molded article, comprising:
disposing the label for in-mold forming of claim 1 in a mold having a wall and an interior with the first thermoplastic resin film facing the interior and the second thermoplastic resin film facing the wall; and
hardening molten or softened resin in the mold with the label for in-mold forming being embedded in the resin.

25. The method for forming a molded article of claim 24, wherein at least one method selected from the group consisting of injection molding, blow molding, pressure-difference forming, and expansion molding is conducted.

26. The method for forming a molded article of claim 24, wherein the molten or softened resin does not contact the antenna or the IC chip.

\* \* \* \* \*